US007284649B2

(12) United States Patent
Shiraki et al.

(10) Patent No.: US 7,284,649 B2
(45) Date of Patent: Oct. 23, 2007

(54) SHEET FEEDING ROLLER

(75) Inventors: Keita Shiraki, Inuyama (JP); Koji Yamaguchi, Mizunami (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 71 days.

(21) Appl. No.: 11/296,450

(22) Filed: Dec. 8, 2005

(65) Prior Publication Data

US 2006/0142132 A1 Jun. 29, 2006

(30) Foreign Application Priority Data

Dec. 8, 2004 (JP) ............................ 2004-355571

(51) Int. Cl.
*B65G 13/00* (2006.01)

(52) U.S. Cl. ...................................... 193/35 R; 492/56

(58) Field of Classification Search .................. 193/37, 193/35 R; 492/28, 48, 49, 56

See application file for complete search history.

(56) References Cited

U.S. PATENT DOCUMENTS 5,607,039 A * 3/1997 Byers et al. .................. 193/37
5,744,238 A * 4/1998 Limperis et al. ......... 428/411.1
6,042,100 A * 3/2000 Jones et al. ................ 271/9.13
6,059,095 A * 5/2000 Tsuji .......................... 198/780
6,939,279 B2 * 9/2005 Shea et al. .................... 492/56

FOREIGN PATENT DOCUMENTS

JP 2001-220029 8/2001

* cited by examiner

*Primary Examiner*—James R. Bidwell
(74) *Attorney, Agent, or Firm*—Westerman, Hattori, Daniels & Adrian, LLP

(57) ABSTRACT

A sheet feeding roller, available at a lower cost, having lower hardness with securing both abrasion resistance and sustainability of friction coefficient. The sheet feeding roller comprises a hub, an inner layer provided on an outer peripheral surface of the hub, and an outer layer provided on an outer peripheral surface of the inner layer, the inner layer and the outer layer are formed by an unfoamed cured body of thermosetting urethane rubber wherein the outer layer is harder than the inner layer.

1 Claim, 1 Drawing Sheet

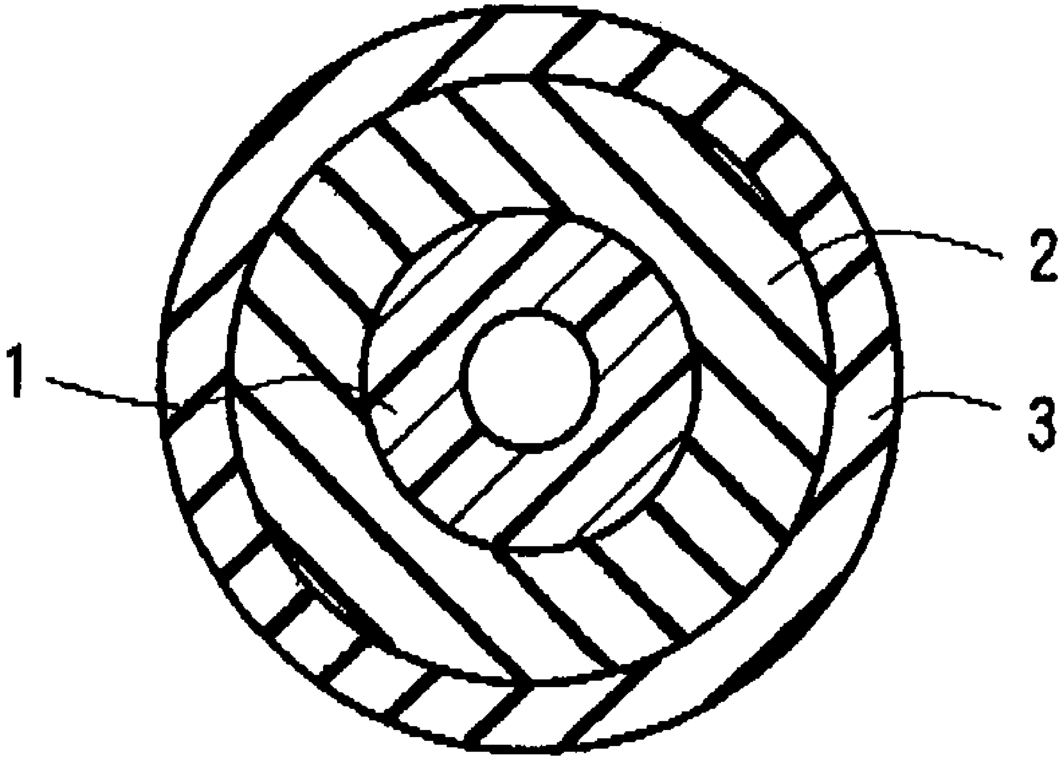
Figure

SHEET FEEDING ROLLER

BACKGROUND OF THE INVENTION

1. Field of the Invention

The present invention relates to a sheet feeding roller, such as a pick-up roller, a feed roller, a reverse roller or a transport roller, for transporting paper in an electrophotographic apparatus such as a copying machine, a printer or a facsimile machine.

2. Description of the Art

Sheet feeding rollers are generally required to have a high abrasion resistance and to maintain a friction coefficient for a long time. Further, sheet feeding rollers are required to have low hardness for the purpose of ensuring separation of sheets of paper from each other (ensuring a sufficient nip width) and of preventing damages of paper and the like.

Therefore, there has been proposed a sheet feeding roller comprising a hub (shaft) and a single or two-layer elastic layer(s)formed on an outer peripheral surface of the hub. Where the elastic layer has a single-layer structure, the elastic layer comprises an unfoamed cured body of EPDM (ethylene-propylene-diene rubber), urethane rubber or the like. Where the elastic layer has a two-layer structure, an inner layer thereof comprises a foam cured body of urethane rubber or the like and an outer layer thereof comprises an unfoamed cured body of silicone rubber or the like (see, for example, Japanese Patent No. 3571983).

In recent years, the sheet feeding rollers are required to have lower hardness as a copying machine or the like has been highly sophisticated. However, it is apparent that the sheet feeding roller having a single elastic layer has its limitation to decrease its hardness while securing abrasion resistance and sustainability of friction coefficient. On the other hand, since the inner layer of the sheet feeding roller having a two-layer structure as an elastic layer is a foam cured body, lower hardness can be achieved compared with that having a single elastic layer, however, such a sheet feeding roller has an extremely high cost due to complicated production process including foam formation process.

In view of the foregoing, it is an object of the present invention to provide a sheet feeding roller, available at a lower cost, having lower hardness with securing both abrasion resistance and sustainability of friction coefficient.

SUMMARY OF THE INVENTION

According to the present invention to achieve the aforesaid objects, there is provided a sheet feeding roller comprising a hub, an inner layer provided on an outer peripheral surface of the hub, and an outer layer comprising at least one layer provided on an outer peripheral surface of the inner layer, the inner layer and the outer layer are formed by an unfoamed cured body of thermosetting urethane rubber (a cured body of solid urethane rubber) wherein the outer layer is harder than the inner layer.

According to the sheet feeding roller of the present invention, since both of the inner layer and the outer layer comprise an unfoamed cured body of thermosetting urethane rubber, both of them can be produced similarly. Further, the sheet feeding roller of the present invention can be produced by the equipment where the conventional single elastic layer (unfoamed cured body of urethane rubber or the like) is formed, and thus can be produced at a lower production cost. Further, since the outer layer is formed harder than the inner layer, the surface thereof is hard while the entire product can be softened. A combination of the hard surface and the entire softness enables compatibility between securing both abrasion resistance and sustainability of friction coefficient, and the entire appropriate softness.

The outer layer is not limited to a single layer and may have two or more layers. For example, where the outer layer comprises a first inside sub-layer and a second outside sub-layer, the hardness of the inner layer, the first inside sub-layer of the outer layer and the second outside sub-layer (outermost layer) of the outer layer is increased in this order, and a hardness difference between the inner layer and the second outside sub-layer maybe lowered. In this case, the first inside sub-layer absorbs stress such as creep between the inner layer and the second outside sub-layer. Further, the first inside sub-layer prevents the adhesion from being weakened between the inner layer and the second outside sub-layer when the hardness difference between these two layers is too large. Still further, when the hardness of the inner layer, the second outside sub-layer (outermost layer) of the outer layer and the first inside sub-layer of the outer layer is increased in this order and the second outside sub-layer is slightly softened, transportability of paper can be improved.

Especially, when a sheet feeding roller has an inner layer having an Asker-C hardness of 20 to 70 degrees, an outer layer having a JIS-A hardness of 40 to 80 degrees and a JIS-A hardness of 5 to 45 degrees when being measured from the outer layer side of an integral laminate of the inner layer and the outer layer, the resultant abrasion resistance and sustainability of friction coefficient can be optimized, and the resultant total hardness can be optimized as a sheet feeding roller.

BRIEF DESCRIPTION OF THE DRAWING

The sole FIGURE of the drawing is a sectional view illustrating one embodiment of a sheet feeding roller according to the present invention.

DESCRIPTION OF THE PREFERRED EMBODIMENTS

The present invention will hereinafter be described in detail by way of an embodiment thereof.

The sole figure shows one embodiment of a sheet feeding roller according to the present invention. The sheet feeding roller may, for example, include a cylindrical hub 1, an inner layer 2 provided on an outer peripheral surface of the hub 1, and an outer layer 3 comprising a single layer provided on an outer peripheral surface of the inner layer 2. The inner layer 2 and the outer layer 3 are both formed by an unfoamed cured body of thermosetting urethane rubber, wherein the outer layer 3 is harder than the inner layer 2.

Thus, since the outer layer 3 is formed so as to be harder than the inner layer 2, the surface is hard while the entire product can be softened, which enables an appropriate sheet feeding roller. A combination of the hard surface and the entire softness enables compatibility between securing both abrasion resistance and sustainability of friction coefficient, and the entire appropriate softness. For this reason, a sufficient nip width can be ensured for a long time so that separation of sheets of paper from each other can be improved and damages of paper can be prevented.

For optimizing the sheet feeding roller, the inner layer 2 preferably has an Asker-C hardness of 20 to 70 degrees, more preferably 30 to 50 degrees, and the outer layer 3 preferably has a JIS-A hardness of 40 to 80 degrees, more preferably 50 to 70 degrees. Further, a JIS-A hardness measured from the outer layer 3 side of an integral laminate of the inner layer 2 and the outer layer 3 is preferably 5 to 45 degrees, more preferably 10 to 30 degrees.

For optimizing the sheet feeding roller, the inner layer 2 preferably has a thickness of 3 to 30 mm, more preferably 5 to 20 mm and the outer layer 3 preferably has a thickness of 0.2 to 3 mm, more preferably 0.5 to 1.5 mm.

Next, materials and the like for forming the hub 1, the inner layer 2 and the outer layer 3 constituting the sheet feeding roller of the present invention will be described hereinafter.

Exemplary materials for forming the hub 1 include synthetic resin such as polyacetal (POM), acrylonitrile-butadiene-styrene copolymer (ABS), polycarbonate and nylon, and metallic materials such as iron, stainless steel and aluminum.

The inner layer 2 can be obtained by crosslinking non-crosslinked thermosetting urethane rubber so as to be cured. An exemplary compound for forming the non-crosslinked thermosetting urethane rubber comprises, for example, polypropylene glycol (PPG), polyisocyanate, a chain lengthening agent, a plasticizer and the like. The hardness of the inner layer 2 obtained by crosslinking for curing is adjusted by adjusting mixing ratios of the chain lengthening agent and the plasticizer based on polypropylene glycol (PPG). For example, when the Asker-C hardness of the inner layer 2 is to be within the above mentioned preferred range (20 to 70 degrees), 4 parts by weight of the chain lengthening agent and 50 to 10 parts by weight of the plasticizer are blended based on 100 parts by weight of polypropylene glycol (PPG). Further, when the Asker-C hardness of the inner layer 2 is to be within the above mentioned more preferred range (30 to 50 degrees), 4 parts by weight of the chain lengthening agent and 35 to 20 parts by weight of the plasticizer are blended based on 100 parts by weight of polypropylene glycol (PPG).

The outer layer 3 can also be obtained by crosslinking non-crosslinked thermosetting urethane rubber so as to be cured. An exemplary compound for forming the non-crosslinked thermosetting urethane rubber comprises, for example, polyetherpolyol, polyisocyanate, a chain lengthening agent, a plasticizer and the like. The polyetherpolyol is obtained by mixing the polypropylene glycol (PPG), also used for forming the inner layer 2, with polytetramethyleneether glycol (PTMG). The hardness of the outer layer 3 can be increased as compared with that of the inner layer 2 by including polytetramethyleneether glycol (PTMG). For example, when the JIS-A hardness of the outer layer 3 is to be within the above-mentioned preferred range (40 to 80 degrees), the weight ratio between polytetramethyleneether glycol (PTMG) and polypropylene glycol (PPG) is in the range of PTMG/PPG=99/1 to 50/50. Further, when the JIS-A hardness of the outer layer 3 is to be within the above-mentioned more preferred range (50 to 70 degrees), the weight ratio between polytetramethyleneether glycol (PTMG) and polypropylene glycol (PPG) is in the range of PTMG/PPG=90/10 to 60/40.

The sheet feeding roller of the present invention is produced, for example, by using the above-mentioned compounds in the following manner.

A mold for forming an inner layer is prepared with the shaft set coaxially therein. The compound for forming an inner layer, non-crosslinked thermosetting urethane rubber, is filled into a space defined by the shaft and the inner surface of the mold and the entire mold is put into an oven or the like so as to be heated at predetermined conditions. Thus, an unfoamed cured body (inner layer 2) of thermosetting urethane rubber is obtained, which has a cylindrical shape formed onto an outer peripheral surface of the shaft. Then, the cylindrical inner layer 2 is removed from the shaft and is also unmolded. As such heating conditions for forming the inner layer 2, the temperature for crosslinking is 120 to 130° C. and its time is 20 to 40 minutes, because the object to be crosslinked is thermosetting urethane rubber. Then, the thus unmolded cured body may be subjected to a secondary curing process, as required. Such a secondary curing process is conducted at a temperature lower than that of the above-mentioned crosslinking, for example, 100 to 110° C.

In turn, the unmolded cylindrical unfoamed cured body (inner layer 2) is cleaned. A shaft of a mold for forming an outer layer is inserted into a hollow of the inner layer 2 and is set coaxially in the mold. The compound for forming an outer layer, non-crosslinked thermosetting urethane rubber, is filled into a space defined by the outer periphery of the inner layer 2 and the inner surface of the mold, and the entire mold is put into an oven or the like so as to be heated at predetermined conditions. Thus, an unfoamed cured body (outer layer 3) of thermosetting urethane rubber is obtained, which has a cylindrical shape formed onto an outer peripheral surface of the inner layer 2. Then, a cylindrical laminate of the inner layer 2 and the outer layer 3 is removed from the shaft and is also unmolded. The heating conditions and the secondary crosslinking conditions for forming the outer layer 3 are the same as those for the inner layer 2.

The cylindrical laminate of the inner layer 2 and the outer layer 3 is cut into a predetermined length. In turn, a hub 1 of the sheet feeding roller is pressed into a hollow of the cylindrical laminate. Thus, the intended sheet feeding roller can be obtained.

In the manufacturing method of such a sheet feeding roller, since both of the inner layer 2 and the outer layer 3 are formed by crosslinking non-crosslinked thermosetting urethane rubber so as to be cured, both are produced in a similar method. Further, since the method for producing both of the inner layer 2 and the outer layer 3 is similar to that for producing the conventional single elastic layer (unfoamed body of urethane rubber or the like), the inner layer 2 and the outer layer 3 of the present invention can be produced by using such a conventional equipment. For this reason, the sheet feeding roller of the present invention can be produced at a lower cost.

Further, since both of the inner layer 2 and the outer layer 3 are thermosetting urethane rubber, the affinity between the inner layer 2 and the outer layer 3 is good, resulting in strong adhesion therebetween.

When the sheet feeding roller of the present invention is used in an apparatus such as a copying machine, an adhesive, a primer or the like may be coated on an outer peripheral surface of the hub 1 so that the inner layer 2 may not spin free circumferentially. Alternatively, the hub 1 may have a groove (or grooves) formed axially on its surface. Further, to improve transportability of paper, an outer peripheral surface of the outer layer 3 may be polished after being unmolded in the above-mentioned method for producing the sheet feeding roller so that the outer peripheral surface is roughened. Alternatively, a mold having a roughened inner surface, which is treated with electric discharge, chemical etching, shot blast or the like, may be used, so that a roughened inner surface is transferred onto an outer peripheral surface of the outer layer 3, resulting in the roughened outer peripheral surface of the outer layer 3.

In the above-mentioned embodiment, the outer layer 3 comprises a single layer, but may comprise two or more layers. In this case, since the hardness of each layer for forming the outer layer 3 can be varied, versatility of possible designing can be increased and thus fine adjustment is available.

The sheet feeding roller according to the present invention is advantageously employed as a pick-up roller, a feed roller, a reverse roller, a transport roller for office automation equipment such as a copying machine, and may be employed for a vending machine, an automatic ticket checker, an automatic teller machine, a money changing machine, a counting machine and a cash dispenser.

Next, an explanation will be given to Examples and Comparative Examples.

EXAMPLE 1

A sheet feeding roller was produced by using the following materials such that the inner layer has an Asker-C hardness of 20 degrees, the outer layer has a JIS-A hardness of 40 degrees and a JIS-A hardness (total JIS-A hardness) measured from the outer layer side of an integral laminate of the inner layer and the outer layer is 5 degrees. As for the Asker-C hardness of the inner layer and the JIS-A hardness of the outer layer, each specimen for the inner layer and the outer layer was produced by an inner layer only and an outer layer only, respectively, and the thus obtained specimen was used for such measurement.

Preparation of Non-crosslinked Thermosetting Urethane Rubber for Forming an Inner Layer Non-crosslinked thermosetting urethane rubber for forming an inner layer was prepared by mixing 4 parts by weight of a chain lengthening agent (trimethylolpropane (TMP)), 50 parts by weight of a plasticizer (dibutyl carbitol adipate; ADEKA CIZER RS705 available from Asahi Denka Co., Ltd. of Tokyo, Japan) and 0.01 parts by weight of catalyst (DBU-formate) based on 100 parts by weight of polypropylene glycol (PPG) (PREMINOL S 3005 (monool content; 0.8% by weight, Mn: 5000, Number of functional groups: 3, Total unsaturation degree: 0.0048 meq/g) available from Asahi Glass Company Ltd. of Tokyo, Japan) and stirring the resultant mixture for two minutes under reduced pressure.

Preparation of Non-crosslinked Thermosetting Urethane Rubber for Forming an Outer Layer Urethane prepolymer having an NCO group at an terminal thereof (NCO content: 3.0% by weight, NCO index: 105) was prepared by mixing 50 parts by weight of polytetramethyleneether glycol (PTMG) and 50 parts by weight of polypropylene glycol (PPG) (PREMINOL S 3005 (monool content: 0.8% by weight, Mn: 5000, Number of functional groups: 3, Total unsaturation degree: 0.0048 meq/g) available from Asahi Glass Company Ltd. of Tokyo, Japan), and defoaming and dehydrating the resultant mixture in vacuo at 80° C. for one hour, and then mixing 14 parts by weight of polyisocyanate (tolylene diisocyanate (TDI)) therein for reaction under nitrogen atmosphere at 80° C. for 3 hours.

Non-crosslinked thermosetting urethane rubber for forming an outer layer was prepared by defoaming the thus obtained urethane prepolymer in vacuo at 90° C. for 30 minutes and then mixing 1.8 parts by weight of a chain lengthening agent (1,4-butane diol (1,4-BD)), 1.2 parts by weight of a chain lengthening agent (trimethylolpropane (TMP)), 50 parts by weight of a plasticizer (dibutyl carbitol adipate; ADEKA CIZER RS705 available from Asahi Denka Co., Ltd. of Tokyo, Japan) and 0.02 parts by weight of catalyst (DBU-formate) therewith, and stirring the mixture for two minutes under reduced pressure.

Production of a Sheet Feeding Roller

In a similar way to the above-mentioned embodiment, first, a mold for forming an inner layer was prepared with a shaft (outside diameter: 9 mm) set coaxially therein. The non-crosslinked thermosetting urethane rubber for forming an inner layer was filled into a space defined by the shaft and the inner surface of the mold, and the entire mold was put into an oven so as to be heated at 130° C. for 30 minutes for crosslinking. Thus, an unfoamed cured body (inner layer having a thickness of 9 mm) of thermosetting urethane rubber was obtained, which had a cylindrical shape formed onto an outer peripheral surface of the shaft, and was unmolded. In turn, unmolded cylindrical unfoamed cured body (inner layer) was cleaned, and was set coaxially in the mold for forming an outer layer. The non-crosslinked thermosetting urethane rubber for forming an outer layer was filled into a space defined by the outer periphery of the inner layer and the inner surface of the mold, and the entire mold was put into an oven so as to be heated at 130° C. for 30 minutes for crosslinking. Thus, an unfoamed cured body (outer layer having a thickness of 1 mm) of thermosetting urethane rubber was obtained, which had a cylindrical shape formed onto an outer peripheral surface of the inner layer. Then, a cylindrical laminate of the inner layer and the outer layer was unmolded. The cylindrical laminate of the inner layer and the outer layer was cut into a length of 20 mm. In turn, a hub (length: 25 mm, outside diameter: 10 mm) having a cylindrical shape made of polyacetal (POM) was pressed into a hollow of the cylindrical laminate. Thus, the intended sheet feeding roller was obtained.

EXAMPLE 2

A sheet feeding roller was produced by using the following materials such that the inner layer has an Asker-C hardness of 30 degrees, the outer layer has a JIS-A hardness of 50 degrees and a JIS-A hardness (total JIS-A hardness) measured from the outer layer side of an integral laminate of the inner layer and the outer layer is 10 degrees. The sheet feeding roller was produced in substantially the same manner as in Example 1.

Preparation of Non-crosslinked Thermosetting Urethane Rubber for Forming an Inner Layer Non-crosslinked thermosetting urethane rubber for forming an inner layer was prepared in substantially the same manner as in Example 1, except that the amount of a plasticizer was changed to 35 parts by weight.

Preparation of Non-crosslinked Thermosetting Urethane Rubber for Forming an Outer Layer Non-crosslinked thermosetting urethane rubber for forming an outer layer was prepared in substantially the same manner as in Example 1, except that the amount of polytetramethyleneether glycol (PTMG) was changed to 60 parts by weight and the amount of polypropylene glycol (PPG) was changed to 40 parts by weight.

EXAMPLE 3

A sheet feeding roller was produced by using the following materials such that the inner layer has an Asker-C hardness of 50 degrees, the outer layer has a JIS-A hardness of 70 degrees and a JIS-A hardness (total JIS-A hardness) measured from the outer layer side of an integral laminate of the inner layer and the outer layer is 30 degrees. The sheet feeding roller was produced in substantially the same manner as in Example 1.

Preparation of Non-crosslinked Thermosetting Urethane Rubber for Forming an Inner Layer Non-crosslinked thermosetting urethane rubber for forming an inner layer was prepared in substantially the same manner as in Example 1, except that the amount of a plasticizer was changed to 20 parts by weight.

Preparation of Non-crosslinked Thermosetting Urethane Rubber for Forming an Outer Layer Non-crosslinked thermosetting urethane rubber for forming an outer layer was prepared in substantially the same manner as in Example 1, except that each amount of polytetramethyleneether glycol (PTMG), polypropylene glycol (PPG) and a plasticizer was changed to 90 parts by weight, 10 parts by weight, and 0 parts by weight, respectively.

EXAMPLE 4

A sheet feeding roller was produced by using the following materials such that the inner layer has an Asker-C hardness of 70 degrees, the outer layer has a JIS-A hardness of 80 degrees and a JIS-A hardness (total JIS-A hardness) measured from the outer layer side of an integral laminate of the inner layer and the outer layer is 45 degrees. The sheet feeding roller was produced in substantially the same manner as in Example 1.

Preparation of Non-crosslinked Thermosetting Urethane Rubber for Forming an Inner Layer Non-crosslinked thermosetting urethane rubber for forming an inner layer was prepared in substantially the same manner as in Example 1, except that the amount of a plasticizer was changed to 10 parts by weight.

Preparation of Non-crosslinked Thermosetting Urethane Rubber for Forming an Outer Layer Non-crosslinked thermosetting urethane rubber for forming an outer layer was prepared in substantially the same manner as in Example 1, except that each amount of polytetramethyleneether glycol (PTMG), polypropylene glycol (PPG) and a plasticizer was changed to 99 parts by weight, 1 part by weight, and 0 parts by weight, respectively.

COMPARATIVE EXAMPLE 1

A sheet feeding roller having a single elastic layer was produced. The single elastic layer was produced by using the following materials such that a JIS-A hardness was 45 degrees.

Preparation of Non-crosslinked Thermosetting Urethane Rubber for Forming a Single Elastic Layer Non-crosslinked thermosetting urethane rubber for forming a single elastic layer was prepared in substantially the same manner as in Example 1, except that each amount of polytetramethyleneether glycol (PTMG), polypropylene glycol (PPG) and a plasticizer was changed to 50 parts by weight, 50 parts by weight, and 40 parts by weight, respectively.

Production of a Sheet Feeding Roller

First, a mold for forming a single elastic layer was prepared with a shaft (outside diameter: 9 mm) set coaxially therein. The non-crosslinked thermosetting urethane rubber for forming a single elastic layer was filled into a space defined by the shaft and the inner surface of the mold, and the entire mold was put into an oven so as to be heated at 130° C. for 30 minutes for crosslinking. Thus, an unfoamed cured body (single elastic layer having a thickness of 10 mm) of thermosetting urethane rubber was obtained, which had a cylindrical shape formed onto an outer peripheral surface of the shaft. The single elastic layer was unmolded and was cut into a length of 20 mm. In turn, a hub (length: 25 mm, outside diameter: 10 mm) having a cylindrical shape made of polyacetal (POM) was pressed into a hollow of the single elastic layer. Thus, the intended sheet feeding roller was obtained.

COMPARATIVE EXAMPLE 2

A sheet feeding roller having two layers was produced wherein an inner layer was formed by a foam cured body of urethane rubber and an outer layer was formed by an unfoamed body of silicone rubber. The inner layer and the outer layer were produced by using the following materials, respectively.

Production of a Sheet Feeding Roller

First, a mold for forming an inner layer was prepared with a shaft (outside diameter: 9 mm) set coaxially therein. The urethane rubber for forming an inner layer was filled into a space defined by the shaft and the inner surface of the mold, and the entire mold was put into an oven so as to be heated at 70° C. for 30 minutes for foaming. Thus, a foam cured body (inner layer having a thickness of 9 mm) of urethane rubber was obtained, which had a cylindrical shape formed onto an outer peripheral surface of the shaft and was unmolded. In turn, an adhesive was coated on an outer peripheral surface of the unmolded cylindrical foam cured body (inner layer). The thus obtained inner layer was set coaxially in the mold for forming an outer layer. The non-crosslinked silicone rubber for forming an outer layer was filled into a space defined by the outer periphery of the inner layer and the inner surface of the mold, and the entire mold was put into an oven so as to be heated at 130° C. for 120 minutes for crosslinking. Thus, an unfoamed cured body (outer layer having a thickness of 1 mm) of silicone rubber was obtained, which had a cylindrical shape formed onto an outer peripheral surface of the inner layer. Then, a cylindrical laminate of the inner layer and the outer layer was unmolded. The cylindrical laminate of the inner layer and the outer layer was cut into a length of 20 mm. In turn, an adhesive was coated on an outer peripheral surface of a hub (length: 25 mm, outside diameter: 10 mm) having a cylindrical shape made of polyacetal (POM), and the thus treated hub was pressed into a hollow of the cylindrical laminate. Thus, the intended sheet feeding roller was obtained. Further, the manufacturing method of the Comparative Example 2 was complicated as compared with those of Examples 1 to 4 and thus required an increased cost.

Abrasion Resistance

The sheet feeding rollers of the Examples 1 to 4 and the Comparative Examples 1 and 2 were each incorporated in a durability test jig for sheet transportation, and 100,000 sheets of paper were transported. For each of the sheet feeding rollers, the outside diameter thereof was measured before being incorporated into the above-mentioned durability test jig and after transportation of 100,000 sheets of paper, and the difference between the outside diameters thus measured was determined. Results are shown in the following table 1. The symbol ◎ indicates that abrasion resistance was extremely excellent in the case where the reduction amount of the diameter was lower than 50 μm, the symbol ○ indicates that abrasion resistance was excellent in the case where the reduction amount was not less than 50 μm and lower than 130 μm, the symbol Δ indicates that abrasion resistance was slightly inferior but was thought to cause practically no problems in the case where the reduction amount was not less than 130 μm and lower than 200 μm, and the symbol X indicates that abrasion resistance was inferior in the case where the reduction amount was more than 200 μm. The outside diameters were measured by a laser outside diameter measuring tool (Laser Scan Micrometer available from Mitutoyo Corporation).

Sustainability of Friction Coefficient

For each of the sheet feeding rollers, the friction coefficient on an outer peripheral surface was measured, before being incorporated into the above-mentioned durability test jig and after transportation of 100,000 sheets of paper. Results are also shown in the following Table 1. The symbol ◎ indicates that sustainability of friction coefficient was extremely excellent in the case where the friction coefficient after transportation of 100,000 sheets of papers was not less than 1.8, the symbol ○ indicates that sustainability of friction coefficient was excellent in the case where the friction coefficient was less than 1.8 and not less than 1.5, the symbol Δ indicates that sustainability of friction coefficient was slightly inferior but was thought to cause practically no problems in the case where the friction coefficient was less than 1.5 and not less than 1.3, and the symbol X indicates that sustainability of friction coefficient was inferior in the case where the friction coefficient was less than 1.3.

TABLE 1

| | EXAMPLE | | | | COMPARATIVE EXAMPLE | |
|---|---|---|---|---|---|---|
| | 1 | 2 | 3 | 4 | 1 | 2 |
| Inner layer | | | | | | |
| Material | Non-foam | Non-foam | Non-foam | Non-foam | — | Foam |
| Asker-C hardness (degree) | 20 | 30 | 50 | 70 | — | 5 |
| Outer layer | | | | | | |
| Material | Non-foam | Non-foam | Non-foam | Non-foam | Non-foam | Non-foam |
| JIS-A hardness (degree) | 40 | 50 | 70 | 80 | 45 | 55 |
| Entire | | | | | | |
| JIS-A hardness (degree) | 5 | 10 | 30 | 45 | 45 | 5 |
| Reduction amount of outer diameter (μm) | 150 | 100 | 30 | 20 | 150 | 300 |
| Abrasion resistance | Δ | ○ | ◎ | ◎ | Δ | X |
| Friction coefficient | | | | | | |
| Initial | 2.0 | 2.0 | 1.8 | 1.5 | 2.0 | 2.0 |
| After transportation of 100,000 sheets of paper | 1.8 | 1.8 | 1.7 | 1.3 | 1.8 | 1.2 |
| Sustainability of friction coefficient | ◎ | ◎ | ○ | Δ | ◎ | X |

As can be understood from the results shown in Table 1, the sheet feeding rollers of Examples 1 to 4 were excellent in abrasion resistance and sustainability of friction coefficient, and the entire product could be softened, which were regarded as good products. On the other hand, in Comparative Example 1 having a single-layer structure and having softness as same level as that of Example 4, abrasion resistance was inferior to Example 4. Also, in Comparative Example 2 where the inner layer was formed by a foam cured body, the entire product could be softened however the abrasion resistance and the sustainability of friction coefficient were inferior to Examples 1 to 4.

What is claimed is:

1. A sheet feeding roller, comprising:

a hub;

an inner layer provided on an outer peripheral surface of the hub; and an outer layer comprising at least one layer provided on an outer peripheral surface of the inner layer, wherein each of the inner layer and the outer layer is formed from an unfoamed cured body of a thermosetting urethane rubber, wherein the outer layer is harder than the inner layer, wherein the inner layer has an Asker-C hardness of 20 to 70 degrees, the outer layer has a JIS-A hardness of 40 to 80 degrees and a JIS-A hardness measured from the outer layer side of an integral laminate of the inner layer and the outer layer is 5 to 45 degrees.

* * * * *